June 4, 1957  P. H. KOCH  2,794,428
VAPOR GENERATING AND SUPERHEATING UNIT WITH GAS
RECIRCULATION FOR SUPERHEAT CONTROL
Filed Dec. 26, 1952
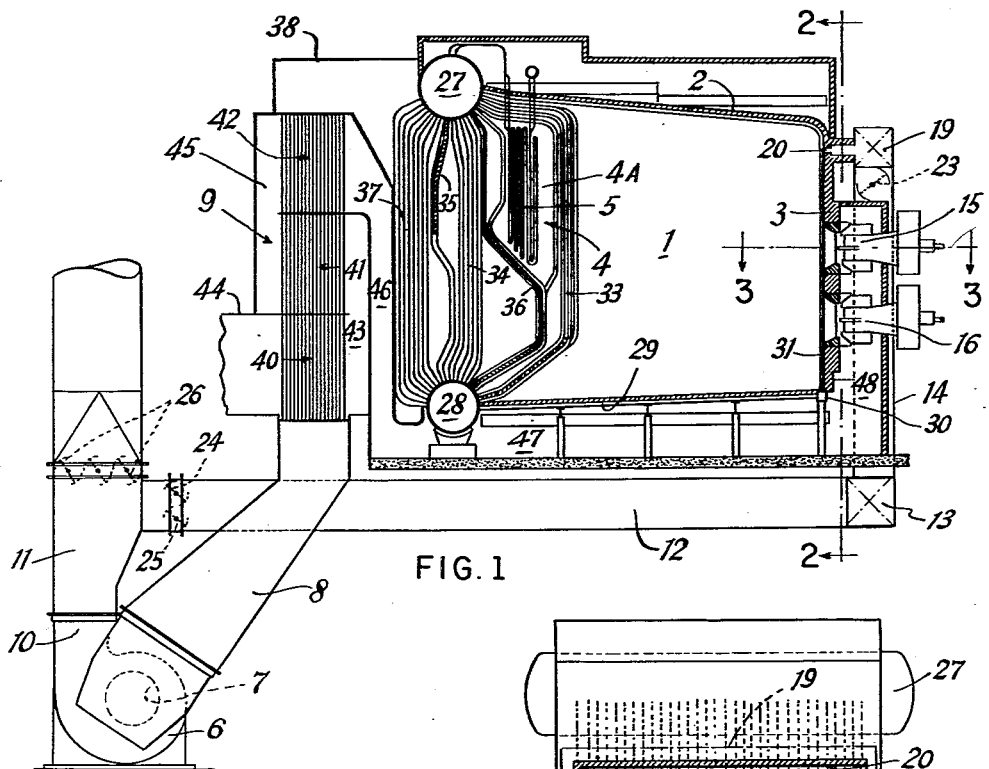
FIG. 1
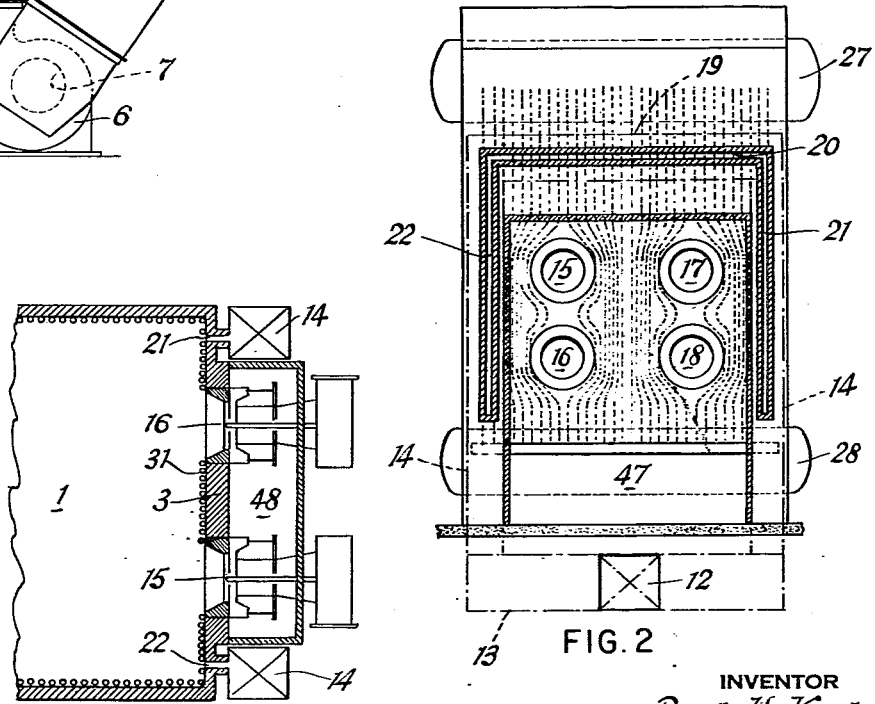
FIG. 3
FIG. 2
INVENTOR
Paul H. Koch
BY
*R. W. Holbrook* ATTORNEY

United States Patent Office 2,794,428
Patented June 4, 1957

2,794,428

VAPOR GENERATING AND SUPERHEATING UNIT WITH GAS RECIRCULATION FOR SUPERHEAT CONTROL

Paul H. Koch, Bernardsville, N. J., assignor to The Babcock & Wilcox Company, New York, N. Y., a corporation of New Jersey Application December 26, 1952, Serial No. 328,062

6 Claims. (Cl. 122—478)

This invention relates to improvements in a vapor generating and superheating unit having a furnace wholly or mainly defined by radiantly heated vapor generating tubes, with the gases passing from the furnace over the tubes of a convection superheater receiving the generated vapor.

The invention particularly relates to a specific arrangement of apparatus elements of the system for controlling vapor superheat temperature by the recirculation of heating gases from a point in the gas flow path downstream of the convection superheater, and the introduction of such recirculated gases into the furnace in a stratifying manner at positions between the fuel burning means of the furnace and the adjacent furnace walls at low rates of vapor generation whereby reduction in furnace wall heat absorption is effected, resulting in a greater heat content of the gases leaving the furnace and available for convection superheating.

In a still more specific aspect, the invention involves a vapor generating unit having a furnace with a roof and upright walls including the vapor generating tubes connected into a fluid circulation system. The furnace is fired horizontally by fluid fuel burners included in one upright furnace wall, the burners projecting combustion products across the furnace and toward a convection superheater disposed in a gas pass leading from the furnace. To maintain a predetermined temperature of superheated vapor at decreasing vapor generating loads, relatively low temperature cooled heating gases are recirculated from a position in the gas flow path downstream of the superheater and are discharged into the furnace in a stratifying manner through upright slots extending through the burner wall at positions close to and elongated in directions parallel to the planes of the furnace side walls extending from the burner wall toward the furnace gas outlet.

The upright slots for recirculated gas introduction into the furnace may be connected at their upper ends by a horizontal inlet slot through which the recirculated gases are introduced as a stratum adjacent to and parallel to the roof of the furnace. With this arrangement, the recirculated gas system outlet to the furnace is of inverted U outline extending around the zone of the burners.

The quantity of recirculated gases, their velocity and their distribution relative to the furnace boundary walls, is regulated so that by their flow in strata generally parallel to the planes of the walls a reduction in radiant heat absorption by those walls is effected. Such a reduction in heat absorption by the walls allows a greater quantity of heat to flow from the furnace in the increased quantity of gas resulting from the combination of the recirculated gas flow and the flow of the freshly developed gaseous products of combustion, the greater mass flow and heat content of the gases flowing over the superheater providing a greater superheater absorption and degree of vapor superheat temperature than would result without the gas recirculation.

The novel characteristics of the invention are pointed out with particularity in the claims annexed to and forming a part of the specification, but for a better understanding of the invention and the specific objects attained by its use reference should be had to the accompanying drawings and descriptive matter in which there is illustrated and described a preferred embodiment of the invention.

In the drawings:

Fig. 1 is a vertical section of an illustrative vapor generating and superheating unit;

Fig. 2 is a transverse vertical section on the line 2—2 of Fig. 1; and

Fig. 3 is a partial horizontal section on the line 3—3 of Fig. 1.

In the drawing there is disclosed a vapor generating and superheating unit including a furnace 1. The furnace boundaries, including its roof 2 and its walls, have vapor generating tubes connected into a fluid circulating system. The furnace is horizontally fired by a number of burners in the burner wall 3 with the combustion elements projected by the burners toward a furnace gas outlet 4 leading to a gas pass 4A in which there is disposed a convection superheater 5.

To maintain the temperature of the vapor at the outlet of the superheater at a predetermined value, the heat absorption by the vapor generating tubes of the furnace boundary surfaces is decreased under a condition of decreasing vapor generation by the operation of a recirculated gas system including a fan 6 having its inlet 7 communicating by ductwork 8 with the gas flow beyond the outlet of the air heater 9. The outlet 10 of the fan communicates through ductwork elements 11—14 with the furnace. The ductwork element 12 leading beneath the unit toward the burner wall connects with the transverse ductwork 13 from the ends of which the ducts 14 lead upwardly at a position near each furnace side wall and interposed relative to the burners 15—18, and the side walls. The tops of the upright ducts 14 are connected by horizontal duct 19 which is in communication throughout its length with a horizontal recirculated gas outlet slot 20 in the burner wall. The upright ducts 14 are similarly in communication with upright slots 21 and 22 indicated particularly in Fig. 3. These upright slots may communicate at their upper ends with the horizontal slot 20, but dampers such as 23 may be provided in the upper ends of the upright ducts 14 to control the recirculated gas introduction by cutting out introduction of the gases along the roof of the furnace.

As shown in the drawings the slots 21 and 22 are connected with their ducts 14 by passageways which direct the recirculated gases through the slots as a sheet or stratum close to and parallel with the adjacent furnace side walls leading from the burner wall 3 toward the superheater 5 and the vapor generating tubes 33. The recirculated gases from the roof duct 19 are similarly directed along the roof 2 by a passageway leading to the slot 20.

The fan thus withdraws relatively low temperature heating gases from gas flow beyond the outlet of the air heater through duct 8 and discharges them into the duct 11. By the operation of dampers 26 and flow of gases to the stack may be restricted increasing the pressure in duct 11 so that a portion of the gases may flow into the recirculation system under control of dampers 24 and 25.

The vapor generating tubes of the illustrative unit are shown as communicating with the upper drum 27 and the lower drum 28. Some of these vapor generating tubes are furnace floor tubes 29 extending to the burner wall header 30. From this header the vapor generating tubes 31 extend along the burner wall and thence along the furnace roof 2 to the drum 27.

Combustion elements projected across the furnace 1 by the burners first contact a group of vapor generating tubes 33 widely horizontally spaced to provide a screen for the superheater and extending directly from a lower drum 28 to the drum 27 as shown. The gases pass transversely of the tubes 33, then across the superheater 5 to the group of steam generating tubes 34 disposed between the baffles 35 and 36 presenting an intermediate down flow gas pass.

The heating gases turn upwardly at the bottom of the intermediate gas pass and flow upwardly through the rear gas pass 37 in which a rear group of tubes may act as downcomer means directly connecting the drums 27 and 28. At the top of the rear gas pass 37, the gases turn downwardly within the breeching 38, and then flow downwardly through the air heater tubes to the duct 8 connected to the inlet of the fan 6.

The air heater 9 is shown as having three transverse air passes. Air enters the first air heater pass 40 from the air inlet 44, continues through that pass, turns within the casing space 43, and then flows reversely through the intermediate pass 41. Turning again within the chamber 45, air flows through the last pass 42, then downwardly through the duct 46 to a duct or chamber 47, beneath the furnace floor. Thence, it flows forwardly to the secondary air chamber or wind box 48 for the burners 15—18.

Whereas the invention has been described with reference to the details of the illustrative embodiment, it is to be appreciated that the use of the invention is not limited to all of such details. The invention is rather to be taken as of a scope commensurate with the scope of the appended claims.

What is claimed is:

1. In a vapor generating and superheating unit: a furnace having vapor generating tubes included in its roof and upright walls; fuel burning means in one upright wall spaced from the adjoining walls; the fuel burning means being confined to a portion of the burner wall between its opposite upright marginal portions; means forming a furnace gas outlet opposite the burner wall; the fuel burning means directing combustion elements toward said gas outlet; means forming a gas pass leading from the gas outlet; a convection vapor superheater having spaced tubes disposed across gas flow in said gas pass; tubular means connecting the vapor generating tubes with the superheater so that the superheater receives vapor generated in the furnace wall tubes; and means for controlling the temperature of the superheated vapor and maintaining it at a predetermined value over a wide range of rate of vapor generation, said means involving a recirculated gas system including a fan and ductwork receiving furnace gases from a position beyond the superheater and discharging them into the furnace; said system having a recirculated gas outlet to the furnace, including upright slots in said upright marginal portions at positions on opposite sides of the fuel burning means and near and parallel to the furnace walls extending from the burner wall toward the furnace gas outlet.

2. In a vapor generating and superheating unit: a furnace having a roof and upright walls including vapor generating tubes; a group of fuel burners in one upright wall and spaced from the adjoining walls; means forming a furnace gas outlet opposite the burner wall; the burners directing combustion elements substantially horizontally and toward said gas outlet; means forming a gas pass leading rearwardly from the gas outlet; a convection vapor superheater having spaced tubes disposed across gas flow in said gas pass; a vapor and liquid drum disposed at the upper part of the unit and normally having vapor and liquid mixtures from the vapor generating tubes discharging therein; a lower drum disposed at the lower part of the unit; downcomer means connecting the lower drum and the liquid space of the upper drum; means connecting the inlets of the vapor generating tubes to the lower drum; and means for controlling the temperature of the superheated vapor and maintaining it at a predetermined value over a wide range of rate of vapor generation, said means involving a recirculated gas system including a fan and ductwork receiving furnace gases from a position beyond the superheater and discharging them into the furnace; said system having a recirculated gas outlet including upright slots in the burner wall disposed at positions on opposite sides of the group of burners and near and parallel to the furnace walls extending from the burner wall toward the furnace gas outlet.

3. In a vapor generating and superheating unit: a furnace having a roof and upright burner and side walls including vapor generating tubes; fuel burning means in one of said walls; the furnace having a gas outlet opposite the burner wall; means forming a gas pass leading from said outlet; a convection superheater disposed in the gas pass and connected to receive the vapor generated in the wall tubes; and means for controlling the temperature of the superheated vapor and maintaining it at a predetermined value over a wide range of rate of vapor generation, said means involving a recirculated gas system including a fan, and ductwork having an inlet communicating with gas flow at a position beyond the superheater and having a recirculated gas outlet slot of inverted U-shape extending through the burner wall; the legs of the slot extending along opposite sides of the fuel burning means close to the planes of the furnace side walls and parallel thereto while the mid-portion of outlet extends along a plane parallel to the furnace roof and close to its level.

4. In a steam generating and superheating unit: a furnace having a roof and upright burner and side walls including upright steam generating tubes; said walls including a front wall and side walls; fuel burning means in the front wall; the furnace having a gas outlet opposite the front wall; means forming a gas pass leading from said outlet; a convection superheater including spaced tubes disposed in the gas pass and connected to receive the steam generated in the wall tubes; and means for controlling the temperature of the superheated vapor and maintaining it at a predetermined value over a wide range of rate of vapor generation, said means involving a recirculated gas system including a fan and ductwork having an inlet communicating with gas flow at a position beyond the superheater and having a recirculated gas outlet narrow slot of inverted U outline extending through the burner wall around the fuel burners; the legs of the recirculated gas outlet being disposed close to the planes of the furnace side walls and parallel thereto while the mid-portion of outlet extends along a plane parallel to the furnace roof and close to its level; the legs and said mid-portion of the outlet being directed along planes parallel to the roof and furnace side walls.

5. In a vapor generating and superheating unit: a furnace having upright front and side walls and a roof including vapor generating tubes; fuel burners in the front wall; means forming a furnace gas outlet opposite the front wall; the burners directing combustion elements substantially horizontally and toward said gas outlet; means forming a gas pass leading from the gas outlet; a convection vapor superheater having upright tubes disposed across gas flow in said gas pass; an air heater subject to the flow of furnace gases beyond the superheater; a vapor and liquid drum disposed at the upper part of the unit and receiving vapor and liquid mixtures from the vapor generating tubes; a liquid drum at the lower part of the unit; downcomer tubes connecting the lower drum and the liquid space of the upper drum; the inlets of the vapor generating tubes being connected to the lower drum; and means for controlling the temperature of the superheated vapor and maintaining it at a predetermined value over a wide range of rate of vapor generation, said means involving a recirculated gas system including a fan and ductwork having an inlet receiving furnace gases from a position beyond the air heater and discharging them into the furnace; said system having a recirculated gas outlet including upright slots disposed at positions on opposite sides of the burners and near and parallel to the furnace walls extending from the burner wall toward the furnace gas outlet.

6. In a vapor generating and superheating unit; a furnace having a roof and upright walls including vapor generating tubes; fuel burning means in one of said walls; the furnace having a gas outlet opposite the burner wall; means forming a gas pass leading from the outlet; a convection superheater including spaced tubes disposed in the gas pass and connected to receive vapor generated in the furnace wall tubes; and a recirculated gas system for maintaining a predeterminel value of the temperature of the superheated vapor as the rate of vapor generation decreases; said system including a fan, ductwork leading from an inlet communicating with gas flow beyond the superheater to the inlet of the fan, other ductwork leading from the fan outlet to recirculated gas outlets communicating with the combustion chamber of the furnace along lines on opposite sides of the fuel burning means and along the side walls adjoining the burner wall, the recirculated gas outlets including narrow passages or slots directing the gases in a stratifying manner over and in front of the tubes of the side walls.

References Cited in the file of this patent

UNITED STATES PATENTS

| | | |
|---|---|---|
| 1,531,532 | Wayles | Mar. 31, 1925 |
| 1,893,731 | Cross | Jan. 10, 1933 |
| 1,979,639 | Rebber et al. | Nov. 6, 1934 |
| 2,250,536 | Kennedy | July 29, 1941 |
| 2,415,068 | Andrew | Feb. 4, 1947 |
| 2,623,505 | Armacost | Dec. 30, 1952 |